Aug. 31, 1965     M. J. SANGER ETAL     3,204,016
METHOD FOR MAKING A COMBINATION FOAM-SPRING CUSHION
Filed July 18, 1961
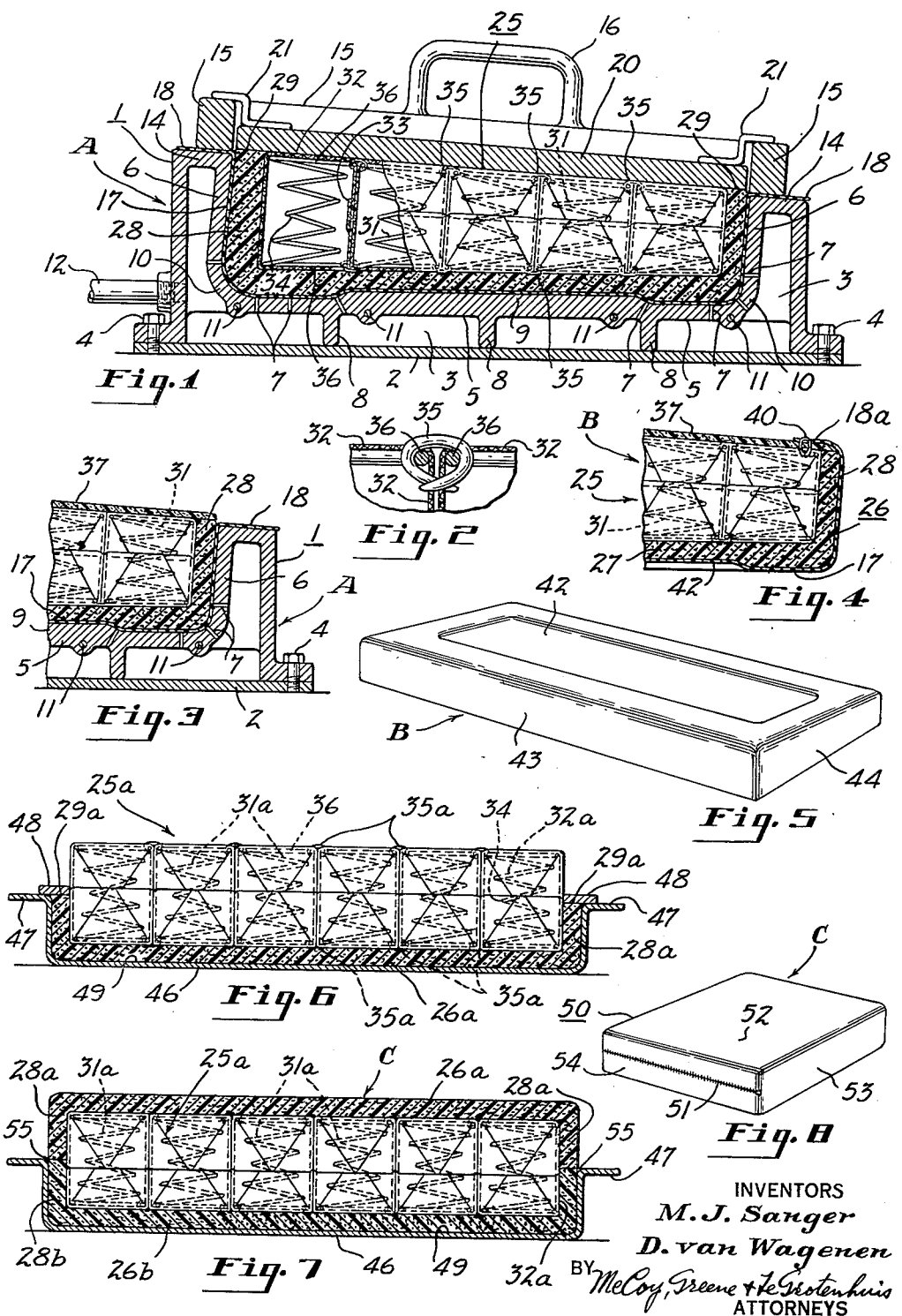
INVENTORS
M. J. Sanger
D. van Wagenen
BY McCoy, Greene + te Grootenhuis
ATTORNEYS

United States Patent Office 3,204,016
Patented Aug. 31, 1965

3,204,016
METHOD FOR MAKING A COMBINATION
FOAM-SPRING CUSHION
Merle J. Sanger, Akron, and Donald van Wagenen, Alliance, Ohio, assignors to The General Tire & Rubber Company, Akron, Ohio, a corporation of Ohio
Filed July 18, 1961, Ser. No. 124,841
4 Claims. (Cl. 264—45)

The present invention relates to a simple economical method of making spring-reinforced foam cushions and more particularly to an improved inexpensive cushion for vehicle seats, furniture or the like.

Heretofore elastic foams have been employed to cover conventional cushions and to improve the cushioning properties (as, for example, in automobile seats), but the overall cost of the articles has been relatively high due to the need for a substantial amount of manual labor during manufacture.

Foam rubber has also been used extensively to provide reversible seats and backs for Danish furniture or other furniture, but such cushions have not been entirely satisfactory due to the ease with which the foam may be collapsed and the inability to provide a strong soft support for heavy persons.

The present invention is adapted to mass produce simple inexpensive cushions at minimum cost without expensive equipment and an improved coil-spring-reinforced reversible cushion for furniture applications. Such cushions are made according to the invention by placing an inexpensive fabric-covered coil-spring unit in a mold cavity in contact with the foam-forming ingredients before the foam has expanded fully so that the foam expands around and encloses the spring unit and penetrates the interstices of the fabric to adhere the foam permanently to the spring unit.

The mold cavity may previously be covered by a thin plastic sheet which conforms to the shape of the cavity to provide the finished cushion with a conforming plastic cover (as, for example, when manufacturing an automobile seat) or such conforming cover may be applied after the cushion is molded.

A reversible symmetrical cushion may easily be made by molding half of the foam covering around the coil-spring unit using the above procedure, removing the resulting article from the mold, and repeating the process in the same mold with the spring unit inverted to mold the other half of the foam covering.

An object of the invention is to produce a very inexpensive foam rubber cushion of improved construction which functions effectively under heavy loads.

A further object of the invention is to provide a simple economical method of making spring-reinforced cushions which does not require expensive equipment.

Another object of the invention is to produce a reversible removable cushion of improved construction for use in modern furniture.

Other objects, uses and advantages of the present invention will become apparent to those skilled in the art from the following description and claims and from the drawings in which:

FIGURE 1 is a transverse vertical sectional view on a reduced scale showing a cushion being built in a mold according to the method of this invention;

FIGURE 2 is a fragmentary sectional view showing a portion of the spring unit on a larger scale;

FIGURE 3 is a fragmentary view showing the cushion in the mold after a thin layer of foam has been applied over the cushion;

FIGURE 4 is a fragmentary sectional view showing the finished cushion after removal from the mold of FIGS. 1 and 3;

FIGURE 5 is a perspective view on a reduced scale showing the completed cushion of FIG. 4;

FIGURE 6 is a longitudinal, vertical sectional view on a reduced scale, showing a modified form of cushion being formed in a mold according to a modified method of this invention;

FIGURE 7 is a longitudinal, vertical sectional view similar to FIG. 6 showing completion of the molding of the cushion of FIG. 6 in the same mold; and FIGURE 8 is a perspective view on a reduced scale showing the completed cushion of FIGS. 6 and 7 provided with a fabric cover.

Referring more particularly to the drawings in which like parts are identified by the same numerals throughout the several views, FIGS. 1 and 3 show a vacuum mold A comprising a main steel casting 1 mounted on a flat bottom plate 2 to provide a suction chamber 3 between the casting and the bottom plate. The casting and the plate are rigidly connected by bolts 4 to effect sealing of the chamber 3. The casting 1 has a bottom wall portion 5 defining the bottom of the mold cavity and has marginal wall portions 6 defining the sides and ends of said cavity, the wall portions 5 and 6 being provided with a multiplicity of air passages 7 providing communication between the interior of the mold cavity and the interior of the chamber 3, whereby suction may be applied to the plastic sheet placed in the mold cavity. The wall portion 5, shown herein, has a series of ribs 8 engaging the plate 2, a thickened central portion 9 of generally rectangular shape and rounded corner portions 10. A series of passages 11 are provided for receiving heating elements or heating fluids, and a suction line 12 is provided to connect the chamber 3 with the vacuum pump or the like to evacuate the entire chamber 3.

The upper marginal portion 14 of the casting 1 has a flat surface located substantially in a single plane and is adapted to receive a heavy metal hold-down frame 15 having a hollow rectangular shape corresponding to the rectangular shape of the portions 6 and 14 whereby the internal surface of the frame 15 is substantially in alignment with the inner surface of the marginal wall 6 as shown in FIG. 1. The frame 15 is preferably provided with a pair of handles 16 located at opposite ends thereof to facilitate lifting of the frame.

A thin thermoplastic resin sheet 17 of uniform thickness is placed on the marginal portion 14 to cover the mold cavity, and the hold-down frame 15 is then placed over the marginal portion 18 of said sheet to hold said marginal portion in place. Thereafter air is evacuated from the chamber 3 and from the mold cavity through the air passages 7 to create a pressure differential between the upper and lower faces of the plastic sheet. This suction draws the sheet against the walls of the mold cavity and causes it to conform to the shape of the mold cavity as shown in FIG. 1. The sheet 17 may be made of conventional plasticized polyvinyl chloride or other suitable deformable plastics such as thermoplastic vinyl resins or the like. If desired, a composite plastic sheet may be employed as described in U.S. Patent No. 2,976,577. The sheet is preferably softened by heat before being placed over the mold cavity and additional heat is preferably applied at the heating passages 11 as is well understood in the art.

If desired, a flat rectangular hold-down plate 20 of a size to completely cover the mold cavity may be provided for use in performing the method of this invention, although this is not essential. As herein shown, a hold-down plate 20 is provided having a plurality of supporting brackets 21 to limit downward movement of said plate. Said plate is preferably relatively thick and heavy so that it can effectively resist expansion of the foam and thereby effect proper positioning of the springs.

The cushion B of FIGS. 1 to 5 comprises a coil spring unit 25 and an elastic foam covering layer 26 enclosing the spring unit. The covering layer 26 has a top portion 27 of generally rectangular outline and marginal portions 28 extending completely around the spring unit 25. The marginal portion 28 is provided with a flat surface 29 where the foam expands against the flat plate 20. Said surface 29, is, of course, substantially in the same plane as the outer surface of the spring unit 25 as is apparent from FIG. 1.

The spring unit 25 is designed for manufacture at minimum cost and is of extremely simple construction. Such unit comprises a series of parallel rows of helical coils 31 of circular metal wire, each having an axial length greater than it maximum diameter. The coils 31 in each row are of exactly the same size, and the coils in different rows are of generally the same shape, but the axial length of the coils is gradually reduced from one row to the other as indicated in FIG. 1. Each coil 31 is tapered in two directions so as to have a central convolution 34 of smaller diameter than the two circular ends 36 of the coil. Thus, each half of the coil 31 functions generally like a helical frusto-conical spring. It will be understood, however, that helical coils of various other types may also be employed in the present invention.

Each row of coils 31 is wrapped in a fabric tube of rectangular cross section formed by a sheet 32 of burlap or other woven fabric having end portions 33 overlapped and joined together in any suitable manner (i.e., sewed together). Each row of springs enclosed in the burlap tube is then placed adjacent to and parallel to another row of burlap-covered coils and attached thereto in such a manner as to locate the coils in parallel aligned upright positions. The simplest and preferred way of connecting the rows of springs is to employ a series of conventional metal clinch rings or hog rings 35 having sharp points which may readily be forced through the burlap and around the end coils 36 of the springs.

The springs 31 are arranged with their axes in longitudinal alignment in each row and in transverse alignment with the springs of other rows so that all of the springs may be securely held by a series of rows of clinch rings 35 as shown in FIG. 1 corresponding to the number of springs in each row. Thus, each spring except the outermost springs is held in place by two diametrically opposed clinch rings 35 at each end thereof as shown in FIG. 1. Each clinch ring extends through the burlap sheets 32 and around the end portions 36 of two adjacent helical coils as shown in FIG. 2. Since the clinching of the rings 35 is an extremely simple operation, the overall cost of the spring unit 25 is extremely low.

The method of the present invention is extremely simple and economical. After the sheet 17 has been caused to conform to the shape of the mold cavity, as shown in FIG. 1, the foam-forming liquid reactants are injected into the mold cavity in the usual manner using, for example, a conventional mixing head as disclosed in U.S. Patent No. 2,764,565 to cover the bottom wall 5 of the mold cavity.

As the fluid materials begin to react to form the foam, the spring unit 25a is placed at the center of the mold cavity with its sides and ends parallel to the sides and ends of the mold walls and is held in this position as the foam expands. The foam then expands around the sides and ends of the spring unit to form the marginal portion 28 of the covering layer 26. As the foam-forming ingredients react and as the foam expands, the foam material penetrates the interstices of the fabric and adheres to the fibers wherever it contacts the burlap or other fabric (throughout the length, width and height of the spring unit 25 and also in the vicinity of the clinch rings 35 or other attaching means at one end of said spring unit). It is preferable to provide a coarse-woven material such as burlap which is inexpensive and will adhere well. The strength of the bond between the fabric and the foam is usually greater than that of the foam so that the fabric cannot be separated from the foam without tearing the foam.

Since the volume occupied by the spring unit 25 is usually more than 80% of the volume of the mold cavity, the covering layer 26 is relatively thin. The marginal portion 28 may have a thickness of 0.3 to 1 inch and usually has an average thickness less than 0.6 inch since a thick cushion is not needed in that region. The top layer 27 is usually somewhat thicker (i.e., 0.5 to 1.5 or 2 inches) to provide the desired cushioning properties.

The amount of foam-producing material placed in the mold cavity and the time at which the spring unit is placed in the mold cavity will determine to some extent the final location of the spring unit in the finished article, but it is preferable to limit the movement of the spring unit and to locate it accurately. As herein shown, the relatively heavy hold-down plate 20 is placed over the spring unit 25 as soon as such unit is placed against the liquid foam-forming ingredients in the mold so as to limit the upward movement of the spring unit caused by the expansion of the foam. The plate 20 also covers the space between the spring unit 25 and the marginal mold wall 6 so as to limit the upward expansion of the foam and form the flat surface 29. It will be understood, of course, that the plate 20 may be omitted and that any excess foam projecting above the spring unit 25 may be cut away in a finishing operation.

After the foam has risen to its maximum as shown in FIG. 1, the hold-down frame 15 and the plate 20 resting thereon is lifted off the mold A, and a thin layer 37 of elastic foam is applied over the spring unit 25 to improve the appearance of the article as shown in FIG. 3. Such layer with a substantially uniform thickness of perhaps one-quarter inch or so may, for example, be applied by conventional spraying methods. It will be understood, however, that the layer 37 is optional and may be omitted to minimize cost.

The final step in the manufacture of the cushion A is the turning of the marginal portion 18 of the plastic sheet inwardly over the margins of the spring unit 25 to form the inturned portions 18a as shown in FIG. 4. The portions 18a may be held in position by clinch rings 40 extending through the burlap and around the end portions 36 of the helical coils or may be attached by conventional sewing or stapling procedures. It will be understood, however, that the cushion A may be cured by heating to improve the properties of the foam and that such curing can be effected after the sheet 17 is applied as shown in FIGS. 1 to 5 or before a covering sheet is applied. It will be understood, of course, that the sheet 17 may be molded to the proper size and shape and applied after the cushion B is formed and cured.

The finished spring-reinforced foam cushion B of this invention is shown in FIG. 5 and has a central rectangular depression 42 in its top wall. As shown, such top wall and the front side wall 43 are substantially rectangular in outline whereas the end walls 44 are generally trapezoidal. This is the shape which is typical of automobile seats, but it will be understood that the cushion of this invention may have various other shapes.

FIGS. 6 and 8 show a modified form of cushion C which is symmetrical and more versatile for use on home furniture. FIGS. 6 and 7 show a metal mold pan 46 having a mold cavity of generally rectangular and longitudinal and transverse cross section. The pan 46 is provided with a flat horizontal marginal flange 47 which provides a support for a flat rectangular metal ring 48 as shown in FIG. 6.

The bottom surface 49 of the mold cavity shown herein is flat and parallel to the flat bottom surface of the removable ring 48.

The method of making the reversible cushion C will be apparent to those skilled in the art from FIGS. 6 and 7. The method is generally the same as described previously except that half of the foam cover is formed during each operation.

The first part of the manufacture is shown in FIG. 6. The liquid foam-forming ingredients are injected into the mold pan 46 to cover the surface 49, and a symmetrical spring unit 25a similar to the unit 25 is then placed in the mold with its outer surfaces parallel to the adjacent surfaces of the mold cavity. The ring 48 is also placed on the mold pan as indicated in FIG. 6. The foam then expands to fill the space below the ring 48 and between the spring unit and the mold pan. This forms the foam-covering layer 26a having a marginal portion 28a that surrounds half of the spring unit 25a.

The ring 48 is removed after the foam has reached its maximum rise as shown in FIG. 6 and the intermediate article comprising the spring unit 25a and the covering layer 26a is removed from the mold pan 46. Said pan, or another pan of the same size and shape as shown in FIG. 7, is then partially filled with liquid foam-forming ingredients in the same manner as before, and said intermediate product is positioned as shown in FIG. 7 with the projecting half of the spring unit 25a within the mold cavity and centrally located therein. As the foam expands it penetrates the interstices of the burlap and fills the space between the spring unit and the walls of the mold cavity. The foam expands until it engages the flat surface 29a of the layer 28a and thereby forms a ridge 55 throughout the margin of the cushion which is located at the medial plane of the cushion. The metal ring 48 in FIG. 6 is located to provide said flat surface 29a at the medial plane of the spring unit 25a, and the unit 25a is located in the mold of FIG. 7 in the same way as in the mold of FIG. 6 so that the finished cushion C is symmetrical about its medial plane and has a layer 26b with a marginal portion 28b.

After the foam has fully expanded as shown in FIG. 7, the finished cushion C is removed and may be post-cured by heating to improve the properties of the elastic foam.

The finished cushion is suitable for use with modern Danish furniture and may be made in various sizes. It may be provided with plastic or fabric covers of conventional types. FIG. 8 shows the cushion provided with a conventional fabric cover 50 having one open end closed by a conventional slide fastener or zipper 51. The cushion has flat rectangular top and bottom surfaces 52, flat rectangular side surfaces 53 and flat rectangular end surfaces 54, but it will be understood that the shape may vary considerably. It will be noted that the surfaces 53 and 54 are perpendicular to each other and perpendicular to the surfaces 52. Cushions of this external shape are used in conventional Danish chairs and various other furniture having removable seats and backs. It will be apparent that the symmetrical cushion of this invention has very many applications and has many advantages over conventional foam rubber cushions which do not have spring reinforcement.

It will be apparent from the drawings that the coil spring unit 25a is constructed substantially like the unit 25. The helical coils 31a, the burlap sheets 32a and the clinch rings 35a of the unit 25a are assembled and connected exactly the same as the corresponding elements 31, 32 and 35 of the unit 25 except that all of the springs 31a in all of the rows are of exactly the same size. Again the burlap sheet forms a tube of rectangular cross section around the coils of each row, and the clinch rings hold the coils in aligned parallel relation in exactly the same way.

Various foam-forming materials may be employed in making the improved cushion of the present invention. Synthetic rubbers and other rubber-like materials capable of forming an elastomeric foam or sponge may be employed, but it is usually preferable to employ liquid foam-forming materials which may be injected through a mixing nozzle or the like. It is preferable to employ polyester urethane foams or polyether urethane foams which may be made by reacting polyisocyanate with a hydroxyl-terminated polyester or polyether. The polyurethane foam may, for example, be made by the method of U.S. Patent No. 2,957,832. Best results are obtained by reacting a polyalkylene ether polyol having a molecular weight of 1000 to 5000 with a diisocyanate such as a tolylene diisocyanate or a phenylene diisocyanate. The conventional "one-shot" or "prepolymer" method may be employed in forming the foam.

Usually there is employed a polyalkylene ether glycol and/or triol; water; a tertiary amine catalyst, such as triethanol amine, n-methyl morpholine, dibutyl ethanol amine, or the like; and a diisocyanate, such as an 80/20 mixture of 2,4- and 2,6-tolylene diisocyanates or the like. If the prepolymer system is employed, a small amount of a polydimethyl silicone oil may be employed such as D.C.–200 oil, made by Dow Corning Corporation, which has a viscosity of 50 centistokes at 25° C. If a one-shot system is employed, it is preferable to employ a small amount of a block copolymer such as a siloxane-oxyalkylene block copolymer having the general Formula I:

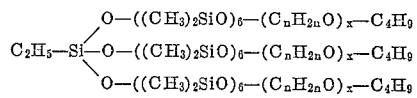

In forming the polyether urethane foam, which must be elastomeric rather than rigid or semi-rigid, it is desirable to employ some trifunctional material. If substantially all of the polyalkylene ether polyols consist of polypropylene ether glycol or other glycol, it is desirable to employ a trifunctional material such as glycerol, trimethylol propane, 1,2,6-hexane triol or other simple polyol. It is usually preferable, however, to employ polyalkylene ether triols such as Carbide "LG–56" triol or Dow "112–3" triol. The preferred triols are propylene oxide adducts of simple polyols having 3 to 8 carbon atoms (such as glycerol or trimethylol propane) having a molecular weight of 1500 to 5000, but it will be apparent that elastomeric polyurethane foams may be made from various other materials.

Carbide "LG–56" triol is a propylene oxide adduct of glycerol containing substantially 90 to 95% secondary hydroxyl radicals, a hydroxyl number of about 56, and an average molecular weight of about 3000. Such triol is made by the Union Carbide Corporation.

Another suitable triol of the same molecular weight which is available commercially is a propylene oxide adduct of glycerol capped with a little ethylene oxide during its manufacture and having 3 primary hydroxyl radicals.

The foam of the above described cushions B and C may, for example, be made according to the following recipe:

*Foam recipe*

| | Parts by weight |
|---|---|
| Carbide LG–56 triol | 100.00 |
| Tolylene diisocyanates [1] | 45.0 |
| Stannous octoate | 0.4 |
| Polyoxyalkylene block copolymer [2] | 0.9 |
| Water | 3.5 |
| N-methyl morpholine | 0.6 |

[1] A mixture of 80% by weight of 2,4-tolylene diisocyanate and 20% by weight of 2,6-tolylene diisocyanate.
[2] A copolymer of the above general formula I where $(C_nH_{2n}O)_x$ is a mixed polyoxyethylene-oxypropylene block containing about 17 oxyethylene units and about 13 oxypropylene units.

The above ingredients may be thoroughly mixed in a conventional mixing nozzle as they are injected into the mold cavity. The materials will react without external heating and reach their maximum rise in a few minutes (i.e., 2 to 3 minutes). It is preferable to precure the foam for 20 minutes or so at an elevated temperature (i.e., in an oven maintained at 120° C.) before the foam is removed from the mold. After such precuring the article may be removed from the mold and then post-cured for one or two hours at an elevated temperature (i.e., 120° C.). If desired, the foam may be squeezed or wrung by external pressure to rupture the cell walls without tearing the foam after removal from the mold and before the post-curing operation, but this is not essential.

The sheet 17 covering the foam does not usually prevent the precuring and post-curing operation. It will be understood, however, that the sheet 17 may, if desired, be applied after the post-curing operation is completed in which case the mold would be imperforate as in FIGS. 6 and 7.

When building the cushion by the method illustrated in FIGS. 6 and 7, the foam is preferably precured for 20 minutes at a temperature of about 120° C. before being removed from the mold. Likewise, the newly made cover layer 26b is preferably precured for 20 minutes at 120° C. before being removed from the mold. Such precuring operation may be performed while minimizing heating of the previously cured layer 26a, but this is not essential since the layer 26a can stand reheating. The finished cushion C is preferably post-cured one or two hours as described previously and may be wrung as described previously to rupture the cell walls.

The foam-forming ingredients used in performing the method of this invention are well known in the art and form no part of the present invention. A detailed description of equivalent polyurethane forming materials is, therefore, unnecessary.

It will be understood that the above description is by way of illustration rather than limitation and that, in accordance with the provisions of the patent statutes, variations and modifications of the specific methods and articles disclosed herein may be made without departing from the spirit of the invention.

Having described our invention, we claim:

1. A process of the character described for making a symmetrical spring-reinforced elastomeric foam cushion for seats and backs comprising the steps of inserting liquid foam-forming ingredients into a generally rectangular mold cavity of substantially uniform depth, thereafter placing a generally rectangular fabric enclosed coil-spring unit of uniform height at the center of said mold cavity parallel to and out of contact with the walls of said cavity, allowing said ingredients to react and expand while limiting the expansion of the foam beyond the medial plane of said spring unit to form a continuous homogeneous elastomeric foam enclosing half of said spring unit and penetrating the interstices of the fabric at the top, sides and ends of said unit, removing the resulting intermediate product from the mold cavity, inserting liquid foam-forming ingredients into a mold cavity of the same shape as said first-named mold cavity, inverting said intermediate product and placing the other projecting half of said spring unit into said last-named mold cavity, and allowing said last-named ingredients to react and expand to form a continuous homogeneous elastomeric foam enclosing said other half of the spring unit and penetrating the interstices of said fabric, whereby the foam completely encloses the coil-spring unit.

2. A process for making a spring-reinforced foam cushion comprising a generally rectangular coil-spring unit having a series of rows of helical springs and a burlap covering for said springs, said process comprising the steps of wrapping around the coils of each row a sheet of burlap which extends the full length of the row, attaching a metal clinch ring at opposite ends of each coil in each row to connect the coil to the burlap, the end portions of the coils of one row of coils thereby being attached to the end portions of the coils of the adjacent row of coils, applying to the resulting coil-spring unit a polyurethane-foam-forming fluid and allowing said fluid to react to form in situ a continuous homogeneous covering layer of elastomeric foam covering the top of said spring unit and extending downwardly around the sides and ends of said spring unit, whereby the foam covers the sides and ends of said unit and penetrates the interstices of the burlap sheets at the top, sides and ends only of said unit and adheres the foam to the burlap adjacent the attaching means at the top of said unit to prevent separation of the foam from the burlap without tearing said foam, said foam being formed with a smooth outer surface of predetermined shape which extends substantially from the top to the bottom of the spring unit.

3. A process for making a symmetrical spring-reinforced elastomeric foam cushion for seats and backs comprising the steps of forming a generally rectangular coil-spring unit having a series of rows of helical springs by wrapping a sheet of burlap around each row of springs, attaching a metal clinch ring at opposite ends of each coil in each row to connect the coil to the burlap and to attach the end portions of the coils in one row of coils to the end portions of the coils in the adjacent row, inserting liquid foam-forming ingredients into a generally rectangular mold cavity of substantially uniform depth and of a size to receive the fabric-covered coil-spring unit; thereafter placing said coil-spring unit at the center of said mold cavity parallel to and out of contact with the walls of said cavity, allowing said ingredients to react and expand to form a continuous elastomeric foam enclosing half of said spring unit and penetrating the interstices of the burlap at the top, sides and ends of said unit while terminating the movement of the foam at the medial plane of said spring unit, removing the resulting intermediate product from the mold cavity, inserting liquid foam-forming ingredients into a mold cavity having a shape corresponding to that of said first-named mold cavity, inverting said intermediate product and placing the other projecting half of said spring unit into said last-named mold cavity, and causing said last-named ingredients to react and expand to form a continuous elastomeric foam enclosing said other half of the spring unit and penetrating the interstices of said fabric at the sides and ends of said unit, whereby the foam completely encloses the coil spring unit and is firmly bonded to the fabric of said unit.

4. A process for making a seat cushion comprising (a) partially filling the bottom of a concave mold cavity having the predetermined shape of said cushion with a polyurethane-foam-forming fluid containing isocyanate-terminated compounds in admixture with hydroxyl-terminated compounds, (b) placing in the mold cavity a generally rectangular spring assembly having a series of rows of coil springs, each row having a sheet of burlap extending the full length of the row and being wrapped around the coils of said row and having attaching means at opposite ends of each coil in each row connecting the coil to the burlap, the end portions of the coils of one row of coils being attached to the end portions of the coils of the adjacent row of coils, and (c) allowing the ingredients of said fluid to react to fill the space between said spring assembly and the walls of said mold with elastomeric foam and to impregnate said burlap at the top, sides and ends only of said assembly, said foam being formed with a smooth outer surface of predetermined shape extending substantially from the top to the bottom of the spring unit.

References Cited by the Examiner

UNITED STATES PATENTS

Re. 24,914   12/60   Koenigsberg _____ 18—59 XR
2,250,800   7/41   Hodges _____ 5—351

(Other references on following page)

UNITED STATES PATENTS

| | | | |
|---|---|---|---|
| 2,271,058 | 1/42 | Binns | 18—59 |
| 2,376,085 | 5/45 | Radford et al. | 264—254 |
| 2,446,775 | 8/48 | Marsack | 5—353 |
| 2,536,310 | 1/51 | Reed | 5—353 |
| 2,742,081 | 4/56 | Solloway | 297—214 |
| 2,753,642 | 7/56 | Sullivan | 18—48 XR |
| 2,785,440 | 3/57 | Toulmin | 18—53 |
| 2,942,653 | 6/60 | Zerbee | 267—83 |
| 3,007,208 | 11/61 | Urban | 18—59 |
| 3,099,518 | 7/63 | Wetzler | 265—47 |

FOREIGN PATENTS

| | | |
|---|---|---|
| 540,514 | 10/41 | Great Britain. |
| 574,683 | 3/58 | Italy. |

ALEXANDER H. BRODMERKEL, *Primary Examiner.*

ARTHUR L. LA POINT, MORRIS LIEBMAN,
*Examiners.*